Sept. 5, 1961

E. PETER 2,999,223

CABLE CONNECTOR

Filed Jan. 5, 1961

INVENTOR
Eugen Peter
BY George H. Spencer
ATTORNEY

United States Patent Office 2,999,223
Patented Sept. 5, 1961

2,999,223
CABLE CONNECTOR
Eugen Peter, Backnang, Wurttemberg, Germany, assignor to Telefunken G.m.b.H., Berlin-Charlottenburg, Germany
Filed Jan. 5, 1961, Ser. No. 80,814
Claims priority, application Germany Jan. 14, 1960
10 Claims. (Cl. 339—205)

The present invention relates to a cable connector.

More particularly, the present invention relates to a cable connector for connecting the ends of two single-core cables or insulated electric conduits, particularly field cable having laced or braided strands.

It has been known to connect cables to each other by tying their end portions into a knot, particularly a so-called weaver's knot, for the purpose of relieving the cable end portions of mechanical stresses. The very ends of the cables, which are stripped of insulation, are then intertwined and covered with an insulating strip. This produces a substantially thickened joint which may prevent the thus spliced cable from being wound onto a drum or reel. Furthermore, the splice or junction is completely exposed to the elements or other external influences. Also, experience has shown that even this type of connection cannot be performed with any particular speed.

It is, therefore, an object of the present invention to provide a connector by means of which cable ends can be joined rapidly in such a manner that they will be in good electrical and mechanical connection, and that the ends proper, which are relied on to establish the electrical connection, will be relieved of mechanical tension.

It is another object of the present invention to provide a connector of the above type which allows the cable ends to be readily disconnected from each other.

The objects of the present invention also include the provision of a connector which has a generally cylindrical configuration and tightly encompasses the insulation of the cables being connected.

With the above objects in view, the present invention resides mainly in two shells made of insulating material and in face-to-face relationship, so as to form an elongated body having a longitudinal axis and being rotationally substantially symmetric about this axis, the shells having at their ends longitudinal passages through which cable ends may be introduced. Each shell is composed of two superposed half shells. An electrically conductive cylindrical element is arranged interiorly of and coaxially with the elongated body, with part of the element being surrounded by one of the shells and the remainder of the element being surrounded by the other shell. The element connects the shells together for preventing movement thereof relative to each other in axial direction and for mounting the shells for rotation relative to each other about the axis of the connector into and out of a starting position. The element has at each of its opposite ends a bore, one of whose openings is in alignment with a corresponding passage. Furthermore, cooperating helical surfaces are provided on each of the shells and on the element for receiving, when the shells are in their starting position, cable ends which project through the passages and bores and for clamping these cable ends when the shells are rotated relative to each other out of their starting position.

Additional objects and advantages of the present invention will become apparent upon consideration of the following description when taken in conjunction with the accompanying drawings, in which.

Figure 1:
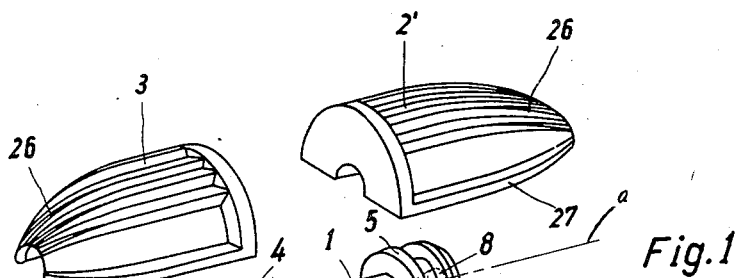
FIGURE 1 is an exploded perspective view showing the individual components of a connector according to the present invention.

Referring now to the drawings, the same show a conductor element 1 which, preferably, is made of non-corrosive metal, and four half shells 2, 3, 2′, 3′, the half shells 2 and 3 forming the left shell and the half shells 2′ and 3′ forming the right shell of the connector. All four shells together give the connector the external appearance depicted in FIGURE 3, namely, that of an elongated generally cylindrical and, more specifically, ellipsoidal connector body which has rotational symmetry. The longitudinal axis of this connector body is shown at a.

The conductor element 1 has two end portions 4 and 5 connected by a cylindrical intermediate portion of reduced cross section. Each of the end portions 4, 5 is formed with an inwardly tapering conical oblique bore 7, 8. The larger end of each bore opens at the flat end face of the corresponding portion 4, 5, and is concentric with the axis a of the connector, this axis also coinciding with the axis of the conductor element 1. The inner smaller end of each of the bores 7, 8 opens at a helical end face surface 9, 10 of the corresponding portion 4, 5. Each of these end surfaces 9, 10 has a stepped abutment 11, 12, the planes of these abutments preferably being arranged in a common plane which is parallel to the axis a. The inner ends of the bores 7, 8 are displaced rightwardly and leftwardly, respectively, from this common plane, by equal amounts. Each of the end portions is additionally provided with an annular groove 13, 14.

The half shells are so profiled that when the two half shells of the same shell are superposed upon each other, each shell will enclose one half of the conductor element 1, the half shells 2, 2′ and the half shells, 3, 3′ being provided with ribs 15, 16, respectively, which are received in the annular grooves 13, 14 of the conductor element 1. The half shells also have concentric outwardly flaring grooves of semi-circular cross section, so as to form passages 17, 18 within which the insulated cable end portions 19, 20 are received.

Figure 2:
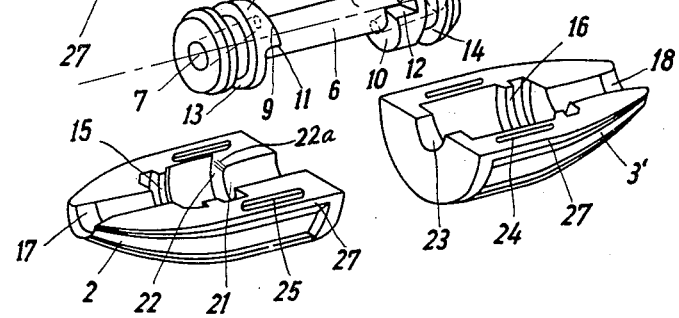
FIGURE 2 is a longitudinal view taken along the dividing plane of the two half shells which make up the right shell of the connector, together with the cable ends which have been introduced, one of the half shells of the left shell of the connector being shown as rotated 45° about the longitudinal axis of the connector.

Each of the half shells 2, 2′ has a relatively thick transverse end wall 21, the outer surface of which is flat, but the inner surface 22 of which is helical. As shown in FIGURES 1 and 2, this inner helical surface is rounded off at 22a towards the partition plane between the two half shells. Each of the half shells 3, 3′ has a thin transverse end wall 23 which has flat inner and outer surfaces.

Each half shell 3, 3′ has two elongated recesses 24 which receive two correspondingly shaped elongated ribs 25 of the half shells 2, 2′.

Each shell is longitudinally fluted so as to make it possible to obtain a firm grip. Additionally, each of the half shells has a longitudinal outside rib 27 which acts as a visual marker and also as a means which can be sensed by touch, to indicate the starting position occupied by the shells when two cable ends are to be connected.

Figure 3:
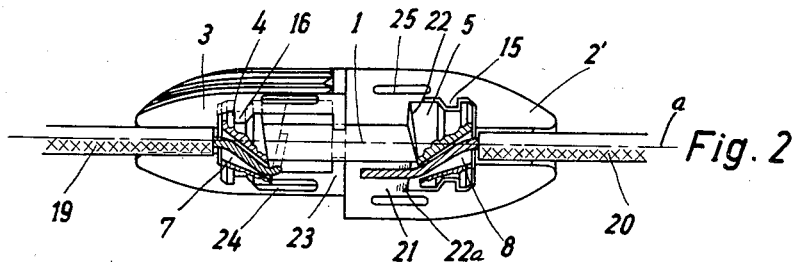
FIGURE 3 is a perspective view of the assembled connector, without the cables.

The conductor element 1 and the half shells 2, 2′. 3, 3′ are assembled to form the connector, as shown in FIGURE 3, the half shells 2, 3 and the half shells 2′, 3′ being secured together in any suitable manner as, for example, by a plastic adhesive, so that the connector 1 serves to mount the two half shells 2, 3 and 2′, 3′ for rotation relative to each other about the longitudinal axis *a*, while preventing axial movement of the shells relative to each other.

The two cable end portions 19 and 20, whose very ends have been stripped of insulation, may then be easily and quickly connected to each other as follows: With the two shells occupying the starting position shown in FIGURE 3, in which the longitudinal ribs 27 of both shells are in alignment with each other, the cable ends are introduced through the passages 17, 18, respectively. In this starting position, the stepped abutments 11, 12 engage the thickest part of each end wall 21, as determined by the helical surface 22, this taking place in the partition plane of the half shells of each shell. The inner ends of the bores 7, 8 will thus be open and the stripped cable ends can be passed through these bores.

The two shells are then rotated relative to each other about the axis *a*, as indicated by the arrows in FIGURE 3. As a result, the cable ends will be wedged between the helical surfaces 9, 10 of the coupling element 1 and the corresponding helical surfaces 22 of the half shells 2, 2'. The pitch of these helical surfaces is so selected that the wedging action exerted thereby will never be exceeded by mechanical tensions exerted upon the cables. It will be appreciated, therefore, that the conductor element 1 serves not only to establish the electrical connection between the cable ends, but that the coupling element 1 also cooperates with the shells to hold them together when there is an axial force tending to pull them apart, thereby establishing the mechanical connection of the cable ends.

The cables may then readily be disconnected by rotating the shells in the direction opposite to that shown by the arrows in FIGURE 3 until the shells occupy the starting position, thereby making it possible for the cable ends to be withdrawn from the passages 17, 18 and the connector.

The half shells may be made of any suitable insulating material as, for example, a plastic, such as polycarbonates. The half shells of the same shell may then be secured to each other by an adhesive, such as ethyl chloride. A typical noncorrosive metal of which the conductor element 1 may be made is nickel-plated brass.

It will be understood that the above description of the present invention is susceptible to various modifications, changes and adaptations, and the same are intended to be comprehended within the meaning and range of equivalents of the appended claims.

I claim:

1. A cable connector comprising, in combination: two shells made of insulating material and in face-to-face relationship so as together to form an elongated body having a longitudinal axis and being rotationally substantially symmetric about said axis, said shells having at their ends longitudinal passages through which cable ends may be received, each of said shells being composed of two superposed half shells; an electrically conductive cylindrical element arranged interiorly of and coaxially with said elongated body, part of said element being surrounded by one of said shells and the remainder of said element being surrounded by the other shell, said element connecting said shells together for preventing movement thereof relative to each other in axial direction and for mounting said shells for rotation relative to each other about said axis into and out of a starting position, said element having at each of its opposite ends a bore one of whose openings is in alignment with a corresponding passages; and cooperating helical surfaces on each of said shells and said element for receiving, when said shells are in said starting positions, cable ends which project through said passages and bores and for clamping said cable ends when said shells are rotated relative to each other out of said starting position.

2. A cable connector as defined in claim 1 wherein said conductive element has end portions formed with annular grooves and an intermediate central portion of reduced cross section joining said end portions; and wherein said half shells are provided with ribs received within said grooves.

3. A cable connector as defined in claim 2 wherein said helical surfaces include a helical surface on each of said end portions, the bore of each corresponding end portion being oblique and having said one opening arranged along said axis and the opposite opening arranged eccentrically and being at the helical surface of the corresponding end portion.

4. A cable connector as defined in claim 3 wherein each of the helical surfaces on each end portion of said element has a stepped abutment, with both abutments having faces lying in a common plane parallel to said axis, said opposite openings of said bores being angularly displaced by the same amount in right and left directions, respectively.

5. A cable connector as defined in claim 1 wherein one half shell of each shell has a thick transverse end wall having an outer surface perpendicular to said axis and an inner helical surface which is rounded off towards the dividing plane of the respective shell, the other half shell of each shell having a thin transverse end wall which has outer and inner surfaces each of which is perpendicular to said axis.

6. A cable connector as defined in claim 1 wherein said half shells are made of plastic and are joined to each other, in the dividing plane of the respective shell, by a plastic adhesive.

7. A cable connector as defined in claim 6 wherein one half shell of each shell is provided with longitudinal recesses and the other half shell of each shell is provided with longitudinal ribs received in said longitudinal recesses.

8. A cable connector as defined in claim 6 wherein said shells are formed on the outside thereof with longitudinal fluting.

9. A cable connector as defined in claim 6 wherein each of said shells carries on the outside thereof marker means for indicating said starting position of said shells.

10. A cable connector as defined in claim 9 wherein said marker means comprise a longitudinal marker rib which can be sensed by touch.

References Cited in the file of this patent

UNITED STATES PATENTS

| 2,182,896 | Hixon | Dec. 12, 1939 |

FOREIGN PATENTS

| 516,492 | Belgium | Jan. 15, 1953 |
| 567,993 | Great Britain | Mar. 13, 1945 |